(12) United States Patent
Dolgunov et al.

(10) Patent No.: US 8,694,790 B2
(45) Date of Patent: *Apr. 8, 2014

(54) STORAGE DEVICE AND METHOD FOR COMMUNICATING A PASSWORD BETWEEN FIRST AND SECOND STORAGE DEVICES USING A DOUBLE-ENCRYPTION SCHEME

(75) Inventors: Boris Dolgunov, Ramat-Gan (IL); Eyal Sobol, Givat Shmuel (IL); David Matot, Kiryat Ono (IL); Vered Babayov, Hod Hasharon (IL)

(73) Assignee: SanDisk IL Ltd., Kfar Saba (IL)

( * ) Notice: Subject to any disclaimer, the term of this patent is extended or adjusted under 35 U.S.C. 154(b) by 150 days.

This patent is subject to a terminal disclaimer.

(21) Appl. No.: 13/073,729

(22) Filed: Mar. 28, 2011

(65) Prior Publication Data

US 2011/0314295 A1    Dec. 22, 2011

Related U.S. Application Data

(63) Continuation of application No. PCT/IB2010/002077, filed on Aug. 25, 2010.

(60) Provisional application No. 61/357,404, filed on Jun. 22, 2010, provisional application No. 61/357,405, filed on Jun. 22, 2010.

(51) Int. Cl.
*G06F 21/31* (2013.01)
*G06F 21/10* (2013.01)

(52) U.S. Cl.
USPC ............. 713/183; 705/72; 726/27; 726/28; 726/29; 726/30; 713/182

(58) Field of Classification Search
USPC ..................... 713/183; 726/29, 30
See application file for complete search history.

(56) References Cited

U.S. PATENT DOCUMENTS 5,509,071 A   4/1996 Petrie et al.
5,623,637 A * 4/1997 Jones et al. ............. 711/164

(Continued)

FOREIGN PATENT DOCUMENTS

| DE | 199 25 389 | 12/2000 |
|---|---|---|
| WO | WO 2006/071725 | 7/2006 |
| WO | WO 2008/060467 | 5/2008 |

OTHER PUBLICATIONS

Corsec Security, Inc. "FIPS 140-2 Non-Proprietary Security Policy", Oct. 22, 2009 pp. 1-27 obtained from http://csrc.nist.gov/groups/STM/cmvp/documents/140-1/140sp/140sp1191.pdf.*

(Continued)

*Primary Examiner* — Linglan Edwards
*Assistant Examiner* — Vu V Tran
(74) *Attorney, Agent, or Firm* — Brinks Gilson & Lione

(57) ABSTRACT

A first storage device provides a host device with access to a private memory area by communicating a password between the first storage device and a second storage device via the host device using a double-encryption scheme. In one embodiment, a host device receives a twice-encrypted password from a first storage device, sends the twice-encrypted password to a second storage device, receives a once-encrypted password from the second storage device, decrypts the once-encrypted password to obtain the password, and sends the password to the first storage device. In another embodiment, a first storage device sends a twice-encrypted password to a host device, receives the password from the host device after the twice-encrypted password is decrypted by a second storage device and the host device, and provides the host device with access to the private memory area only if the password matches one that is stored in the first storage device.

18 Claims, 4 Drawing Sheets

(56) References Cited

U.S. PATENT DOCUMENTS

| | | | |
|---|---|---|---|
| 5,751,813 | A | 5/1998 | Dorenbos |
| 5,790,663 | A | 8/1998 | Lee et al. |
| 6,175,921 | B1 | 1/2001 | Rosen |
| 7,003,667 | B1 * | 2/2006 | Slick et al. .................... 713/182 |
| 8,146,153 | B2 * | 3/2012 | Yuan et al. ...................... 726/19 |
| 8,527,775 | B2 | 9/2013 | Dolganov et al. |
| 2002/0174337 | A1 | 11/2002 | Aihara |
| 2006/0056632 | A1 * | 3/2006 | Kudelski et al. ............. 380/259 |
| 2009/0086269 | A1 | 4/2009 | Nakajima |
| 2009/0125683 | A1 * | 5/2009 | Okamoto et al. ............. 711/115 |
| 2011/0055589 | A1 * | 3/2011 | Hsieh et al. ................... 713/189 |
| 2011/0289137 | A1 * | 11/2011 | Ittah et al. ..................... 709/203 |
| 2011/0314296 | A1 * | 12/2011 | Dolgunov et al. ............ 713/185 |
| 2011/0314301 | A1 * | 12/2011 | Elder et al. ................... 713/189 |
| 2012/0030391 | A1 * | 2/2012 | Rodgers et al. ............. 710/110 |
| 2012/0054500 | A1 * | 3/2012 | Dhuse et al. .................. 713/189 |
| 2012/0278624 | A1 * | 11/2012 | Hamada ........................ 713/168 |
| 2013/0097085 | A1 * | 4/2013 | Peckover ........................ 705/50 |
| 2013/0212707 | A1 * | 8/2013 | Donahue et al. ............... 726/29 |

OTHER PUBLICATIONS

Mingdi Xu et al. "A New Data Protecting Scheme Based on TPM," Software Engineering, Artificial Intelligence, Networking, and Parallel/Distributed Computing, 2007. SNPD 2007. Eighth ACIS International Conference on , vol. 3, no., pp. 943,947, Jul. 30-Aug. 1, 2007.*

Factor, M.; Naor, D.; Rom, E.; Satran, J., "Capability based Secure Access Control to Networked Storage Devices," Mass Storage Systems and Technologies, 2007. MSST 2007. 24th IEEE Conference on , vol., no., pp. 114,128, Sep. 24-27, 2007.*

Yang al et., Password Authentication Schemes with Smart Cards, Computer&Security vol. 18, No. 8, pp. 727-733, 1999.*

Search Report and Written Opinion for PCT/IB2010/002077, 9 pages, Jan. 21, 2011.

Office Action for U.S. Appl. No. 13/073,740, dated Sep. 19, 2012, 8 pages.

Office Action for U.S. Appl. No. 13/073,740, dated Apr. 3, 2013, 9 pages.

Notice of Allowance for U.S. Appl. No. 13/073,740, dated Jul. 1, 2013, 8 pages.

* cited by examiner

STORAGE DEVICE AND METHOD FOR COMMUNICATING A PASSWORD BETWEEN FIRST AND SECOND STORAGE DEVICES USING A DOUBLE-ENCRYPTION SCHEME

CROSS-REFERENCE TO RELATED APPLICATIONS

This application is a continuation of International Application No. PCT/IB2010/002077, with an international filing date of Aug. 25, 2010. This application also claims the benefit of U.S. provisional patent application Nos. 61/357,404 and 61/357,405, both filed on Jun. 22, 2010. Each of these applications is hereby incorporated by reference.

BACKGROUND

In some environments, a host device (such as a personal computer) is used with a first storage device (such as a Universal Serial Bus (USB) device or an embedded or removable memory card) that contains a password-protected private memory area and a second storage device (such as a smart card) that stores the password usable for accessing the private memory area in the first storage device. In operation, the second storage device sends the password to the first storage device via the host device, and, if that password matches one stored in the first storage device, the first storage device provides the host device with access to the private memory area. In this way, the second storage device is used for authenticating access to the private memory area on the first storage device.

A security risk can be presented if the password is transmitted from the second storage device to the host or from the host to the first storage device in an unsecured manner. For example, consider the situation in which the first storage device is a USB device and the second storage device is a smart card. While some currently-available USB devices can communicate with a host device over a secure channel, many currently-available smart cards cannot. Accordingly, even though the smart card may be able to securely store the password and even though the transmission of the password from the host device to the USB device can occur over a secure channel, the absence of a secure channel between the smart card and the host device creates an opportunity for a hacker to access the password (because it is transmitted in plaintext form) and later use that password to gain unauthorized access to the private memory area of the USB device.

OVERVIEW

Embodiments of the present invention are defined by the claims, and nothing in this section should be taken as a limitation on those claims.

By way of introduction, the below embodiments relate to providing a host device with access to a private memory area in a first storage device by communicating a password between the first storage device and a second storage device via the host device using a double-encryption scheme.

In one embodiment, a host device receives a twice-encrypted password from a first storage device, the password being useable for accessing a private memory area in the first storage device. The host device sends the twice-encrypted password to a second storage device, wherein the second storage device is configured to decrypt the twice-encrypted password to obtain a once-encrypted password. The host device then receives the once-encrypted password from the second storage device, decrypts the once-encrypted password to obtain the password, and sends the password to the first storage device. The password can be sent from the host device to the first storage device through a secure channel, if one is available.

In another embodiment, a first storage device sends a twice-encrypted password to a host device, the password being useable for accessing a private memory area in the first storage device. The host device is configured to send the twice-encrypted password to the second storage device for decryption to obtain a once-encrypted password, receive the once-encrypted password from the second storage device, and decrypt the once-encrypted password to obtain the password. The first storage device receives the password from the host device and provides the host device with access to the private memory area only if the password matches one that is stored in the first storage device. The password can be sent from the host device to the first storage device through a secure channel, if one is available.

Other embodiments are possible, and each of the embodiments can be used alone or together in combination. Accordingly, various embodiments will now be described with reference to the attached drawings.

DETAILED DESCRIPTION OF THE PRESENTLY PREFERRED EMBODIMENTS

Introduction

In general, the below embodiments relate to communicating a password between first and second storage devices via a host device using a double-encryption scheme in order to provide a host device with access to a private memory area in the first storage device. Before turning to the details of such communication, an overview of exemplary host and storage devices is provided.

Exemplary Host and Storage Devices

Figure 1:
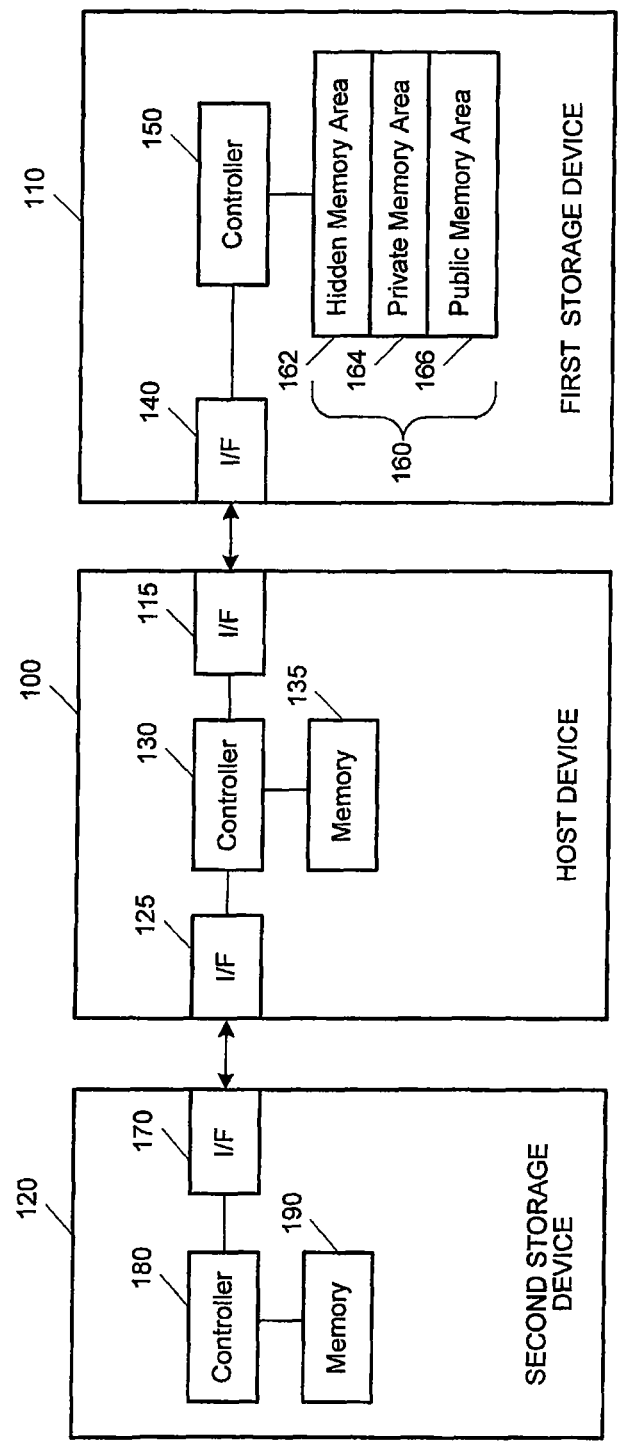
FIG. 1 is a block diagram of an exemplary host device and first and second storage devices of an embodiment.

Turning now to the drawings, FIG. 1 shows a host device 100 in communication with first and second storage devices 110, 120 via first and second interfaces 115, 125, respectively. As used herein, the phrase "in communication with" could mean directly in communication with or indirectly in communication with through one or more components, which may or may not be shown or described herein. For example, the interfaces 115, 125 can contain the physical and electrical connectors to send data and commands between the first and second storage devices 110, 120 and the host device 100. FIG. 1 shows that the host device 110 comprises a controller 130 and a memory 135, although the host device 110 can contain additional elements, which are not shown in FIG. 1 to simply the drawing. A host device 110 can take any suitable form, such as, but not limited to, a personal computer (PC), a mobile phone, a digital media player, a game device, a personal digital assistant (PDA), a kiosk, a set-top box, a TV system, a book reader, or any combination thereof.

The first storage device 110 can take any suitable form, such as, but not limited to, an embedded memory (e.g., a secure module embedded in the host device 110), a universal serial bus (USB) device, a smart card, a handheld, removable memory card, or a removable or non-removable hard drive, such as a solid-state drive. As shown in FIG. 1, the first storage device 110 comprises an interface 140 to communicate with the host device 140, a controller 150, and a memory 160. The first storage device 110 can contain additional elements, which are not shown in FIG. 1 to simply the drawing.

The controller 150 can include, for example, a central processing unit (CPU), a crypto-engine operative to provide encryption and/or decryption operations, read access memory (RAM), and read only memory (ROM) for storing firmware for the basic operations of the first storage device 110. The controller 150 can be implemented in any suitable manner. For example, the controller 150 can take the form of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. Examples of controllers include, but are not limited to, the following microcontrollers: ARC 625D, Atmel AT91SAM, Microchip PIC18F26K20, and Silicon Labs C8051F320. The controller 150 can also be implemented as part of the memory control logic.

The first storage device 110 also contains a memory 160, which can take any suitable form, such as, but not limited to, a mass storage device with solid-state (e.g., flash) memory. In this embodiment, the memory 160 of the first storage device 110 contains three areas or partitions: a hidden memory area 162, a private memory area 164, and a public memory area 166. The hidden memory area 162, the private memory area 164, and the public memory area 166 can all be part of the same physical memory device, or some or all of the areas 162, 164, 166 can be in separate physical memory devices. The hidden memory area 162 is "hidden" because it is internally managed by the controller 150 (and not by the host's controller 130). Data stored in the hidden memory area 162 can also be encrypted. As will be described in more detail below, the hidden memory area 162 can store a password useable for accessing the private memory area 164. The hidden memory area 162 can also store other information, such as, for example, firmware code used by the controller 150 to control operation of the first storage device 110. Unlike the hidden memory area 162, the private and public memory areas 164, 166 can be used to store user data. However, while the public memory area 166 is generally accessible, the controller 150 only provides access to the private memory area 164 if the proper password is provided or some other type of authentication process is satisfied. In this way, the private memory area 164 can be used to securely store data.

Like the first storage device 110, the second storage device 120 can take any suitable form. In one embodiment, the second storage device 120 takes the form of a smart card. However, the second storage device 120 can take other forms, such as, but not limited to, an embedded memory (e.g., a secure module embedded in the host device 110), a universal serial bus (USB) device, a handheld, removable memory card, or a removable or non-removable hard drive, such as a solid-state drive. As shown in FIG. 1, the second storage device 120 comprises an interface 170 to communicate with the host device 140, a controller 180, and a memory 190. The second storage device 120 can contain additional elements, which are not shown in FIG. 1 to simply the drawing. The controller 180 and memory 190 can take any suitable form and can be similar to or different from the form of the controller 150 and memory 160 in the first storage device 110.

Communicating a Password Using a Double-Encryption Scheme

The host device 110 and first and second storage devices 110, 120 can be used in any suitable manner. In one embodiment, the second storage device 120 (e.g., a smart card) is used for authenticating access to the private memory area 164 in the first storage device 110 (e.g., a USB drive or embedded memory). As discussed in the background section above, a security risk can be presented in such an arrangement. For example, while some currently-available USB devices can communicate with a host device over a secure channel, many currently-available smart cards cannot. Accordingly, even though the smart card may be able to securely store the password and even though the transmission of the password from the host device to the USB device can occur over a secure channel, the lack of a secure channel between the smart card and the host device creates an opportunity for a hacker to be able to access the password (because it is transmitted in plaintext form) and later use that password to gain unauthorized access to the private memory area of the USB device.

In order to address this problem, the following embodiment uses a double-encryption scheme to protect the password even though there may not be a secure channel between the second storage device 120 and the host device 100. In general, the password (e.g., a device key) using for unlocking the private memory area 164 of the first storage device 110 is encrypted twice during system initialization and stored in the hidden memory area 162 of the first storage device 110. In this embodiment, the password is first encrypted with a unique key that is accessible only to the host device 100 and then is encrypted a second time with a unique key that is accessible only to the second storage device. This twice-encrypted password can be used to securely transmit the password even though a secure channel is not present between the second storage device 120 and the host device 100, as will be illustrated through the discussion of the flow chart 200 in FIG. 2.

Figure 2:
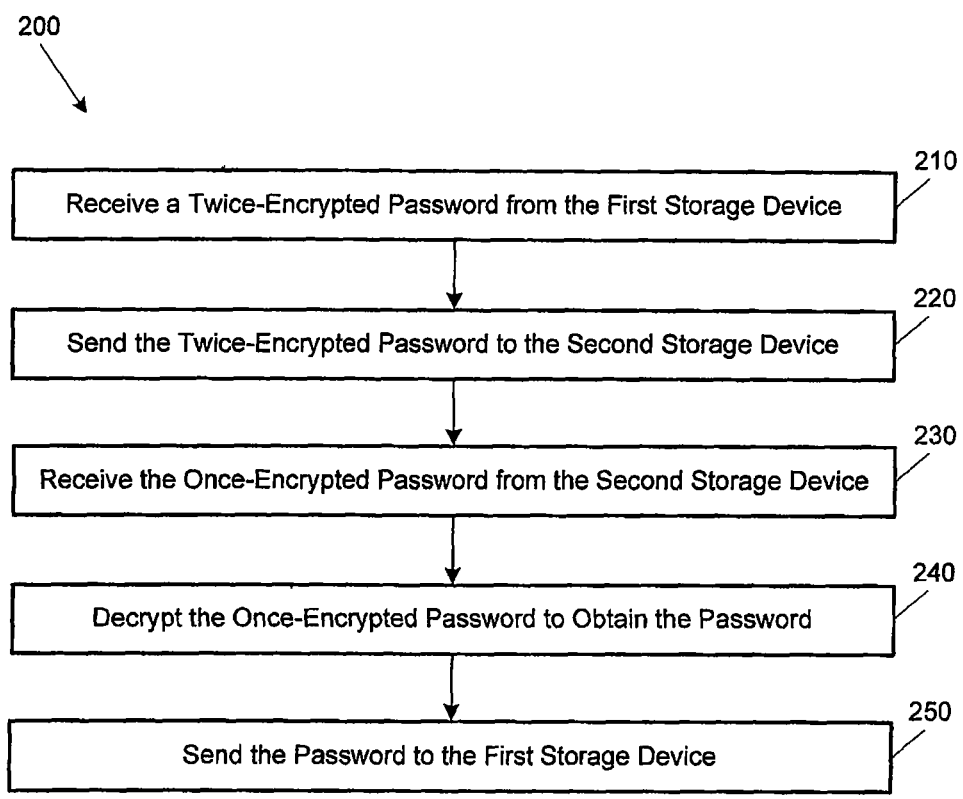
FIG. 2 is a flow chart of a method of an embodiment for communicating a password between first and second storage devices through a host device.

As shown in the flow chart 200 in FIG. 2, the host device 100 receives the twice-encrypted password from the first storage device 110 (act 210) and then sends the twice-encrypted password to the second storage device (act 220). The second storage device 120 then uses its unique key to decrypt the twice-encrypted password to obtain a once-encrypted password (i.e., the password encrypted with the host device's unique key). The host device 110 then receives the once-encrypted password from the second storage device 120 (act 230). Even though the second storage device 120 does not have a secure channel with the host device 110, the transmitted password is encrypted. So, even if a hacker captures the once-encrypted password in transit between the second storage device 120 and the host device 100, the hacker would not have access to the password itself because it is encrypted. When the host device 100 receives the once-encrypted password, the host device 100 decrypts it with its unique key to obtain the password (act 240) and then sends the password in plaintext form to the first storage device via a secured channel (act 250). In addition to storing the once-encrypted password, the first storage device 110 can store the plaintext form of the password (preferably in the hidden memory area 162) and compare the plaintext form of the password received from the host device 100 with the plaintext form of the password stored in its memory 160. If the passwords match, the first storage device 110 can provide the host device 100 with access to the private memory area 164, and the host device 100 can send read/write commands to access the private memory area 164.

Figure 3:
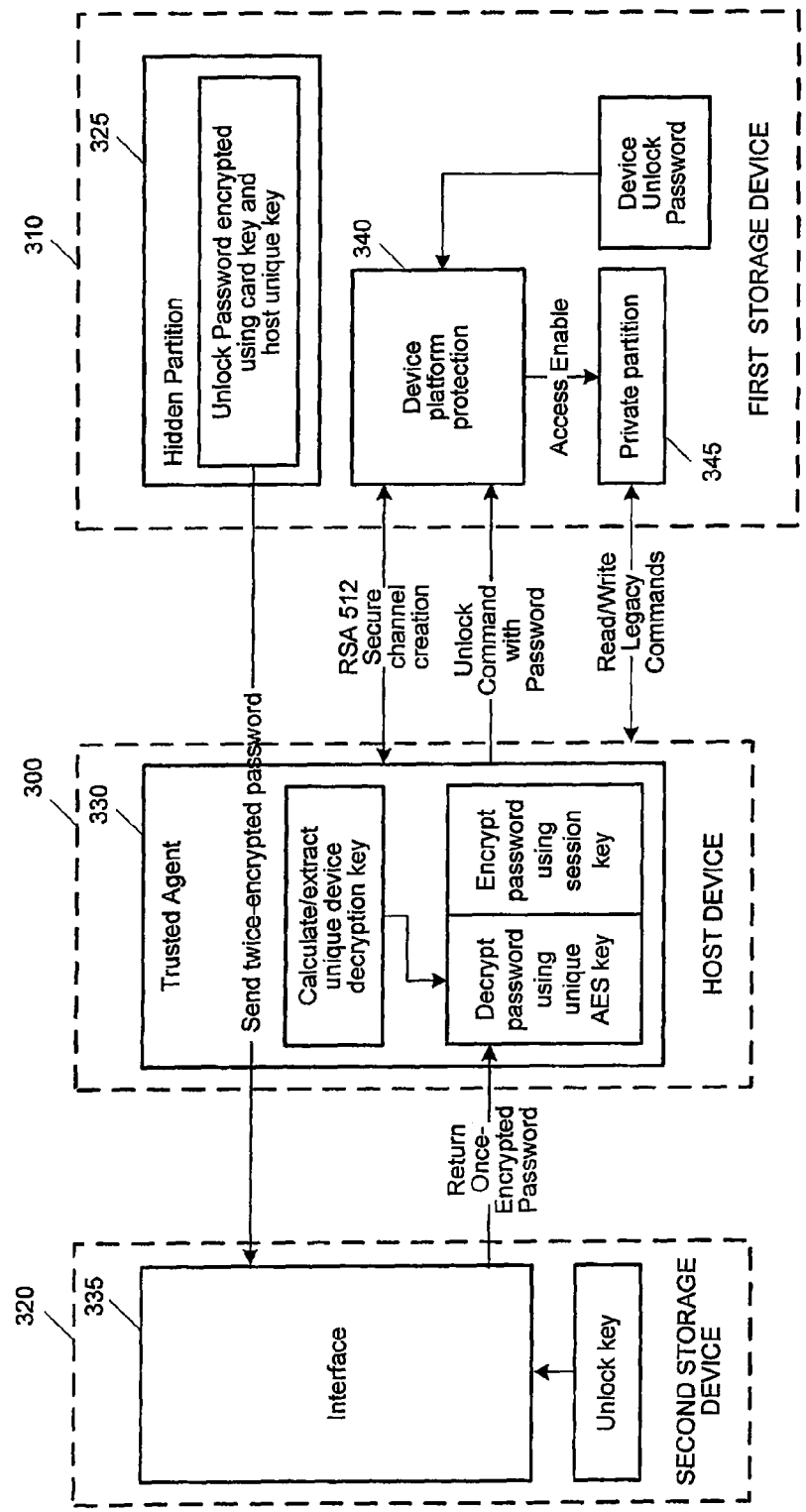
FIG. 3 is a block diagram of an exemplary host device and first and second storage devices of an embodiment.
Figure 4:
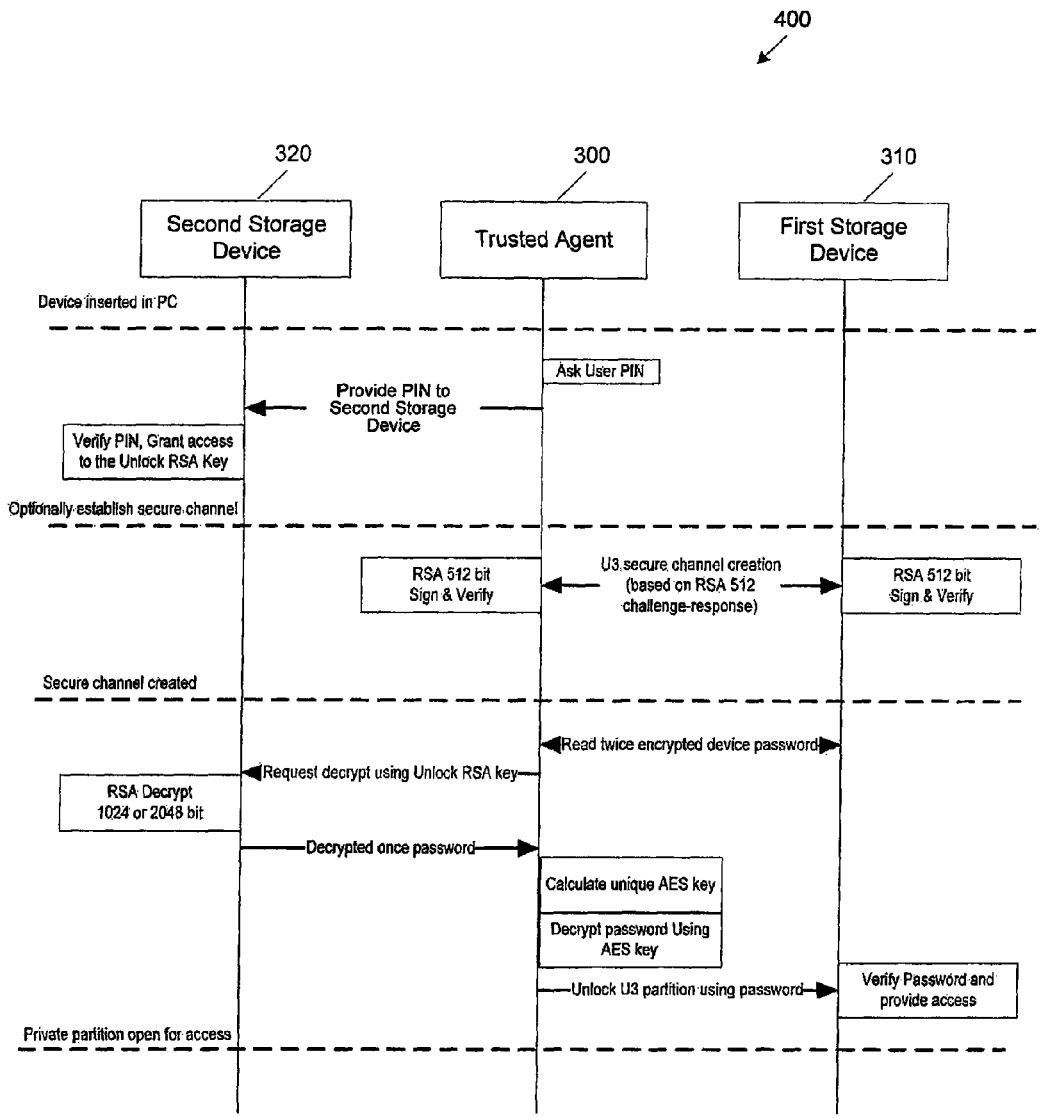
FIG. 4 is a timing diagram of a method of an embodiment for communicating a password between first and second storage devices through a host device.

Turning again to the drawings, FIGS. 3 and 4 are a block diagram and flowchart 400 that provides another illustration of this embodiment. FIG. 3 shows a host device 300 in communication with first and second storage devices 310, 320. The first storage device 310 contains a hidden memory partition 325 that stores a password that can be used to unlock the private memory partition 345 and is twice encrypted: once with a key unique to the second storage device 320 and afterwards with a key unique to the host device 300. The device platform protection block 340 is part of the first storage device's controller and enables access to the private partition 345 if a received password matches a device unlock password, which can be stored in the hidden partition 325. The host device 300 implements a "trusted agent" 300, which can be a software application running on the host device's controller. The trusted agent can perform encryption, establish a secure channel with the first storage device 310, present a graphical user interface to collect user information, and perform other tasks. The second storage device 320 has an interface 335, which can be implemented on the second storage device's controller, that is configured to perform decryption using the second storage device's unique key (the "unlock key").

With reference to the timing diagram in FIG. 4 and the block diagram in FIG. 3, in the embodiment, the trusted agent 330 asks the user of the host device 300 for a PIN number (or other type of identifier) to authenticate the user to the second storage device 320. The second storage device 320 then verifies the PIN and grants access the second storage device's unique key (here, an RSA key). The trusted agent 330 also creates a secure channel with the first storage device 310. In this example, the first storage device 310 is a USB device operating under the U3 standard, and a secure channel is created based on a RSA 512 challenge-response process. After the secure channel is created, the trusted agent reads the twice-encrypted password from the first storage device 310 and sends it to the second storage device 320 along with a request to decrypt the twice-encrypted password with the RSA key stored in the second storage device 320. The second storage device 320 decrypts the twice-encrypted password to obtain the once-encrypted password and then sends the once-encrypted password to the trusted agent 330. The trusted agent 330 then decrypts the once-encrypted password to obtain the password in plaintext form. For example, the trusted agent 330 can calculate or extract a unique device decryption key (e.g., a unique AES key) and then decrypt the once-encrypted password with the unique AES key to obtain the password in plaintext form. The trusted agent 330 then encrypts the password using the session key of the secure session and sends the password to the first storage device 310 along with a command to unlock the private U3 partition. The first storage device 310 verifies the password by having the device platform protection block 340 compare the password received from the trusted agent with the device unlock password stored in the first storage device 310. After the password has been verified, the device platform protection block 340 enables access to the private partition 345, so that the host device 300 can send read/write legacy commands to read from and write to the private partition 345.

As illustrated by these examples, these embodiments can be used to securely communicate a password from a second storage device to a first storage device via a host device even though a secure communication channel does not exist between the second storage device and the host device. This avoids the security risk discussed in the background section above. Like the prior approaches, the second storage device is still used to authenticate the host device to the first storage device. However, instead of sending the password itself, the second storage device provides one level of decryption that is needed to render the password.

Conclusion

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A method for providing a host device with access to a private memory area of a first storage device, the method comprising:

performing by a first storage device in communication with a host device, which is in communication with a second storage device, wherein the first storage device stores a password and a twice-encrypted version of the password:

sending the twice-encrypted password to the host device, the password being useable for accessing a private memory area in the first storage device, wherein the host device is configured to send the twice-encrypted password to the second storage device for decryption to obtain a once-encrypted password, receive the once-encrypted password from the second storage device, and decrypt the once-encrypted password to obtain the password;

receiving the password from the host device; and providing the host device with access to the private memory area only if the password matches the password one that is stored in the first storage device.

2. The method of claim 1, wherein the storage device receives the password from the host device in plaintext form via a secured channel using a session key.

3. The method of claim 1, wherein the twice-encrypted password is stored in a hidden area in the first storage device.

4. The method of claim 1, wherein the second storage device comprises a smart card.

5. The method of claim 1, wherein the first storage device comprises a universal serial bus (USB) device.

6. The method of claim 1, wherein the host device comprises a personal computer (PC).

7. The method of claim 1 further receiving a command to read or write to the private memory area after providing the host device with access to the private memory area.

8. A storage device comprising:

a memory storing a password and a twice-encrypted version of the password and having a private memory area; and a controller in communication with the memory, wherein the controller is configured to:

send the twice-encrypted password to a host device, the password being useable for accessing the private memory area, wherein the host device is configured to send the twice-encrypted password to a second storage device in communication with the host device for decryption to obtain a once-encrypted password, receive the once-encrypted password from the second storage device, and decrypt the once-encrypted password to obtain the password;

receive the password from the host device; and provide the host device with access to the private memory area only if the password matches the password stored in the memory.

9. The storage device of claim 8, wherein the storage device receives the password from the host device in plaintext form via a secured channel using a session key.

10. The storage device of claim 8, wherein the twice-encrypted password is stored in a hidden area in the memory.

11. The storage device of claim 8, wherein the second storage device comprises a smart card.

12. The storage device of claim 8, wherein the storage device comprises a universal serial bus (USB) device.

13. The storage device of claim 8, wherein the host device comprises a personal computer (PC).

14. The storage device of claim 8, wherein the controller is further configured to receive a command to read or write to the private memory area after providing the host device with access to the private memory area.

15. The method of claim 1, wherein the first storage device is embedded in the host device.

16. The method of claim 1, wherein the first storage device is removable from the host device.

17. The storage device of claim 8, wherein the storage device is embedded in the host device.

18. The storage device of claim 8, wherein the storage device is removable from the host device.

* * * * *